United States Patent [19]

Smith

[11] Patent Number: 4,927,674
[45] Date of Patent: May 22, 1990

[54] WOVEN WIRE APPARATUS

[75] Inventor: Bradford L. Smith, Santa Fe, N. Mex.

[73] Assignee: Wovenwire Corporation, Santa Fe, N. Mex.

[21] Appl. No.: 319,653

[22] Filed: Mar. 2, 1989

[51] Int. Cl.$^5$ .......................... A45B 19/00; A45B 27/00
[52] U.S. Cl. ............................................ 428/11; 428/12
[58] Field of Search ........................ 428/11, 12; 52/251

[56] References Cited

U.S. PATENT DOCUMENTS

| | | | |
|---|---|---|---|
| 872,954 | 12/1907 | Martin | 52/251 |
| 998,479 | 7/1911 | Eisen | 52/251 |
| 1,066,212 | 7/1913 | Meltzer | 403/217 |
| 1,620,640 | 3/1927 | Friedrich . | |
| 3,020,660 | 2/1962 | Scherotto | 41/15 |
| 3,169,611 | 2/1965 | Snelson | 189/34 |
| 3,272,976 | 9/1966 | Charchan et al. | 240/10 |
| 3,324,611 | 6/1967 | Gamber | 52/91 |
| 3,387,868 | 6/1968 | Borden | 287/51 |
| 3,546,049 | 12/1970 | Kostich | 428/11 |

OTHER PUBLICATIONS

"John Kostick's Exotica", magazine article published in *Boston Globe*, Mar. 3, 1968.
Brochure and publication of ZIZIX ™, a product of Xoodl, Inc., Plainfield, VT.

*Primary Examiner*—Marion C. McCamish
*Attorney, Agent, or Firm*—Deborah A. Peacock; Robert W. Weig

[57] ABSTRACT

The disclosure is directed to several different woven wire joint structures, each comprising a plurality of intersecting wire elements. The intersecting elements preferably comprise an odd number of wires and are capped or joined at the ends. Retainers are used control the movability of the joint.

39 Claims, 21 Drawing Sheets

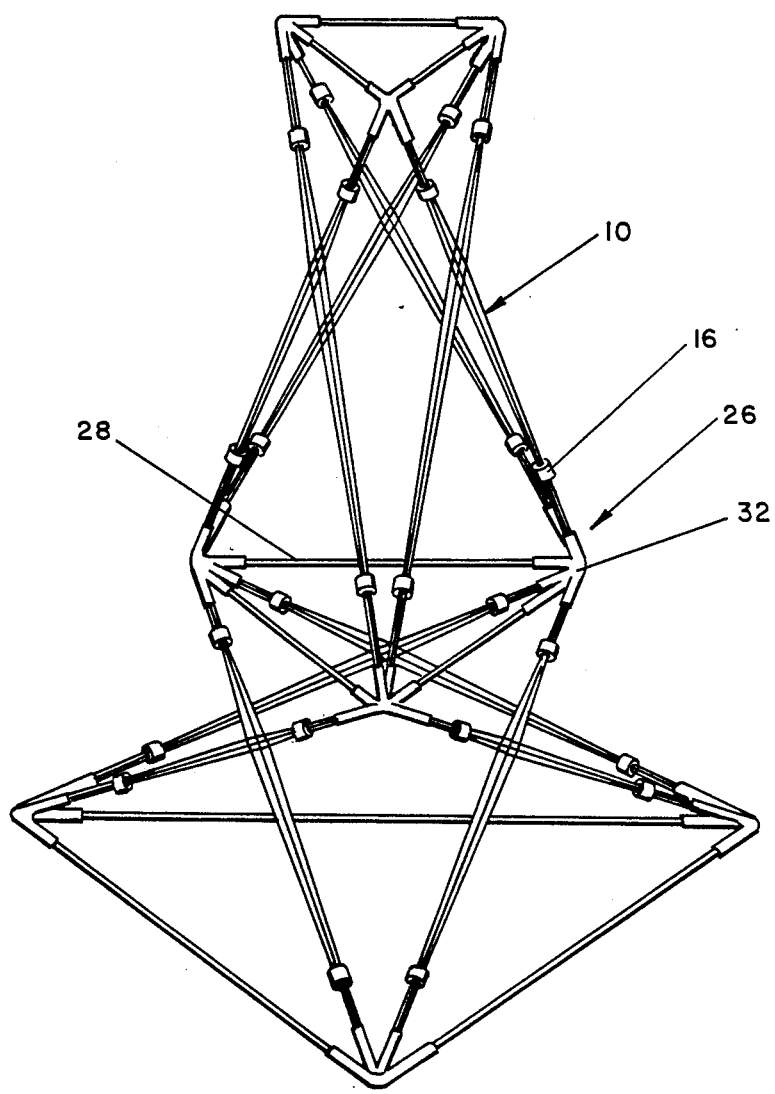
FIG—9

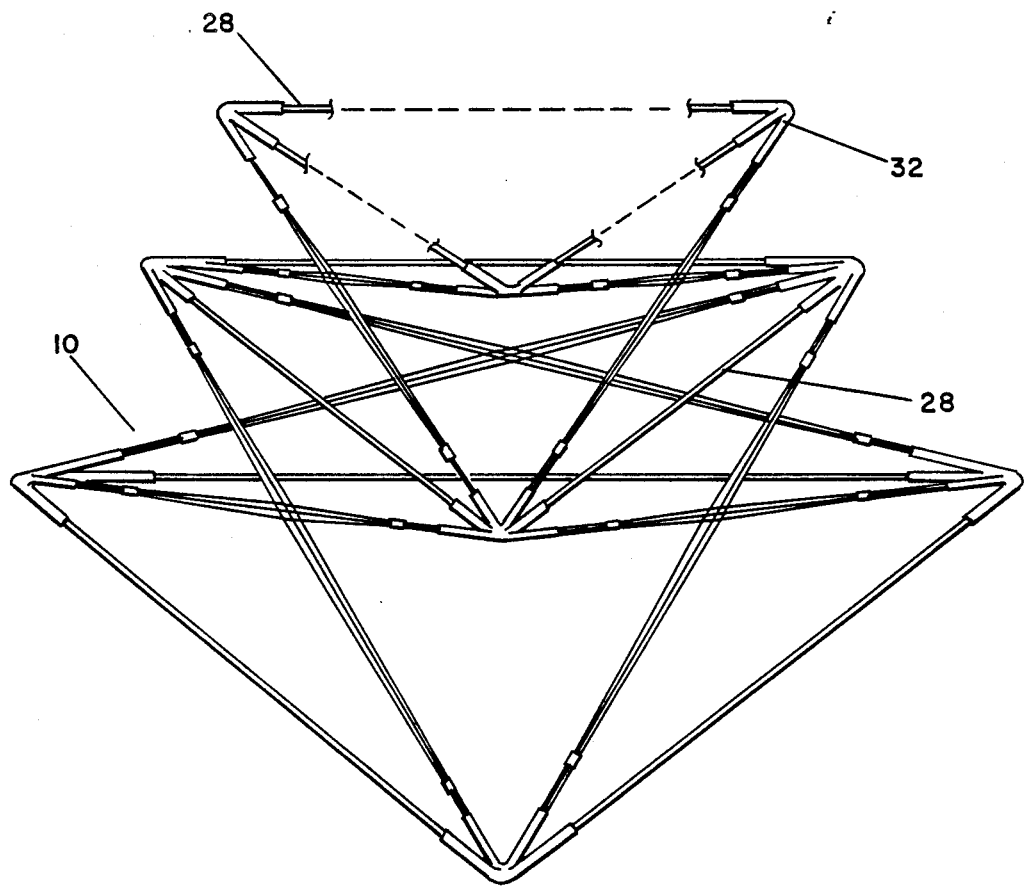
FIG—10
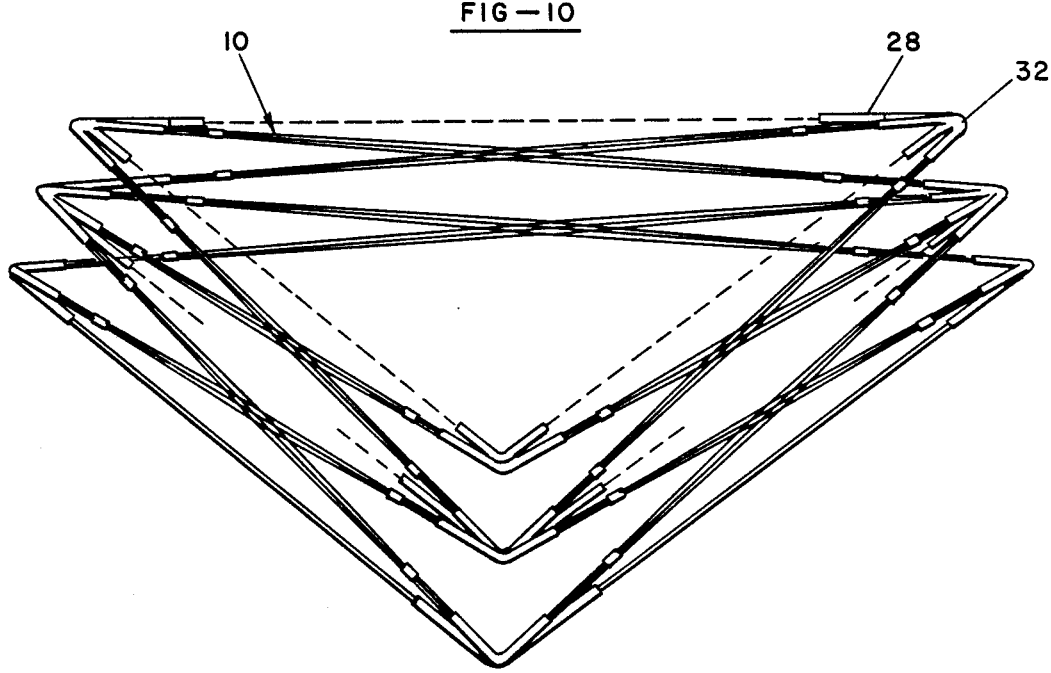
FIG—11

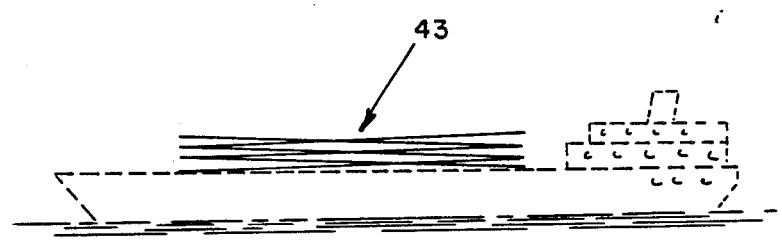
FIG—15
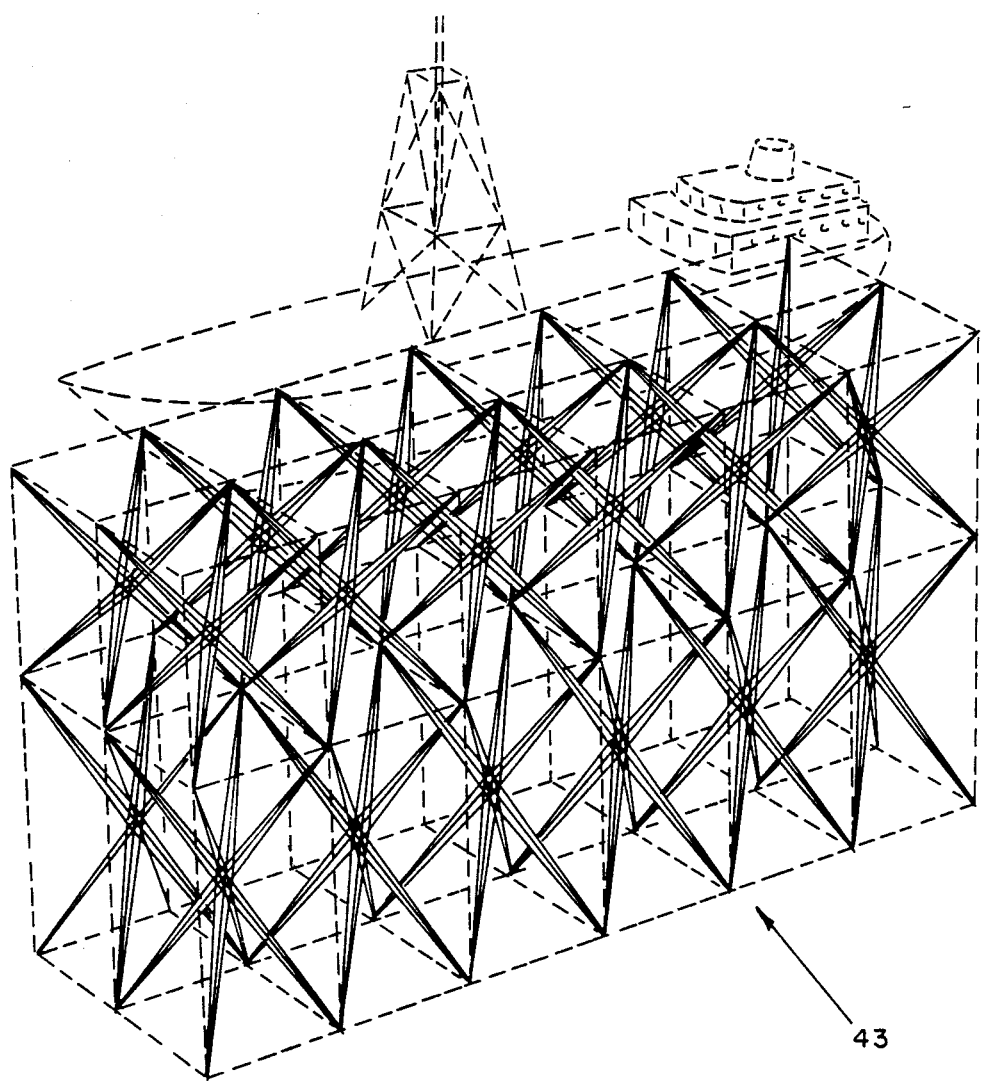
FIG—16

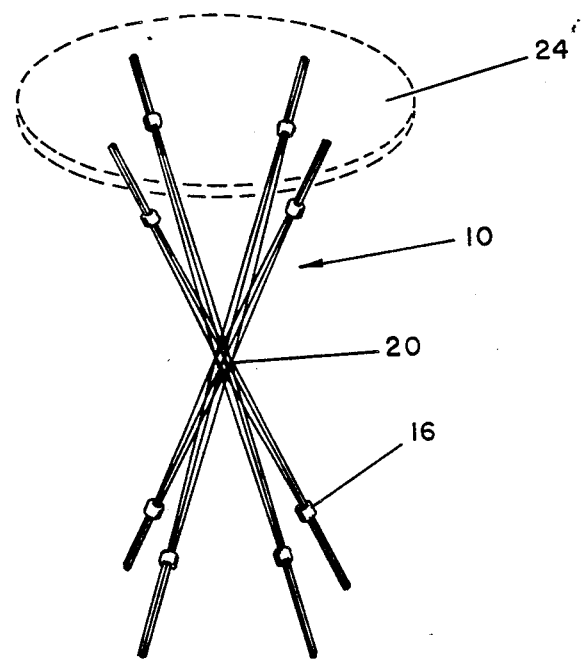
FIG—17
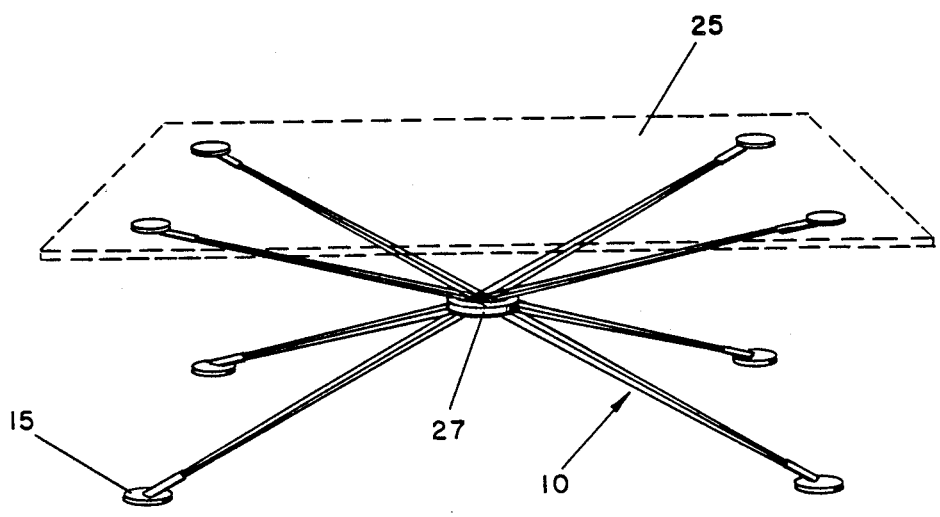
FIG—18

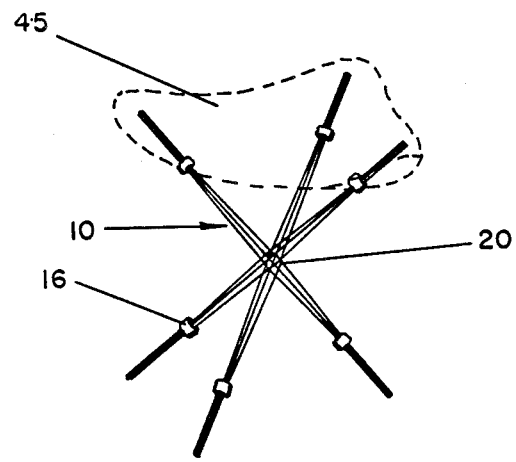
FIG—19
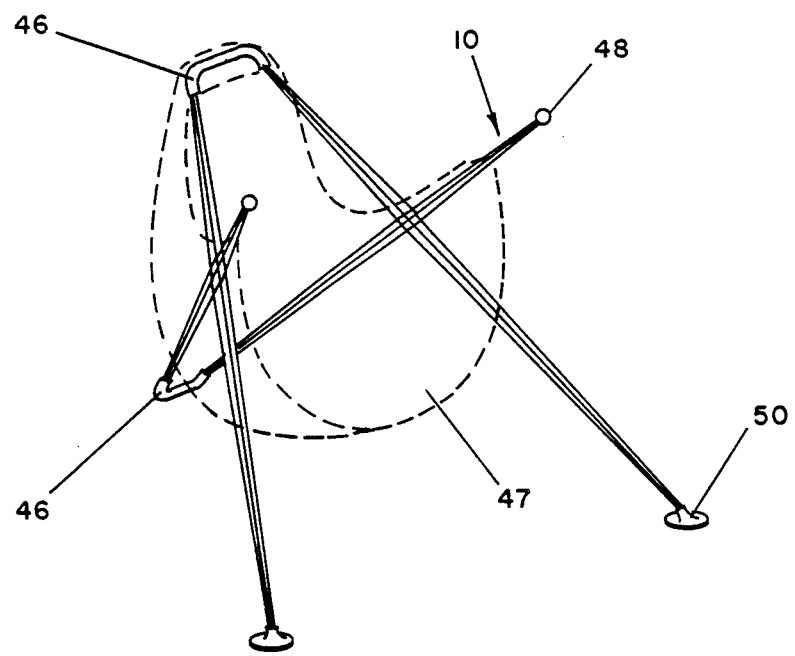
FIG—20

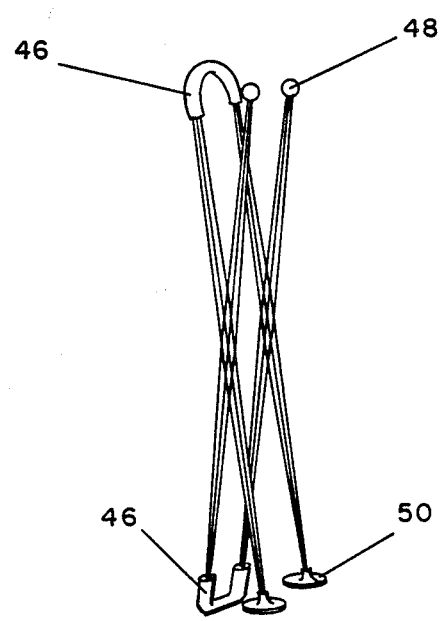
FIG—21
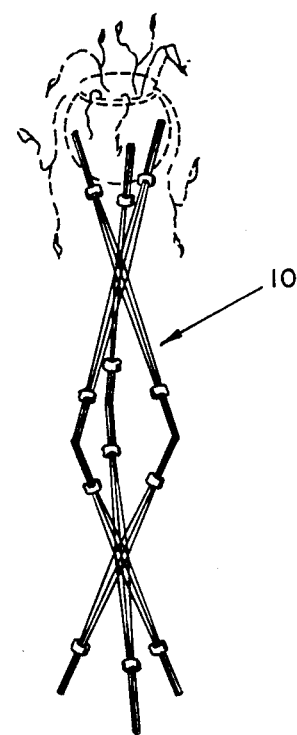
FIG—22
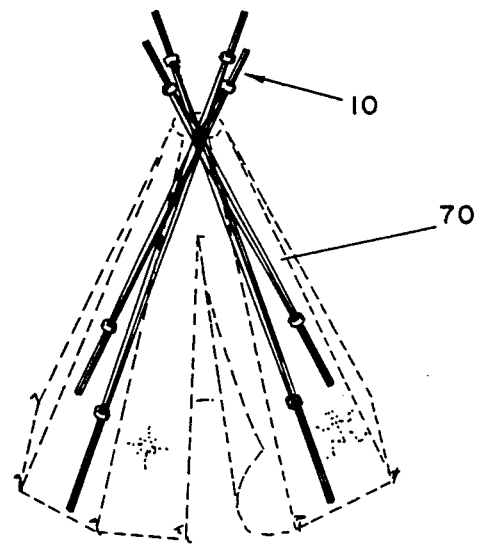
FIG—23

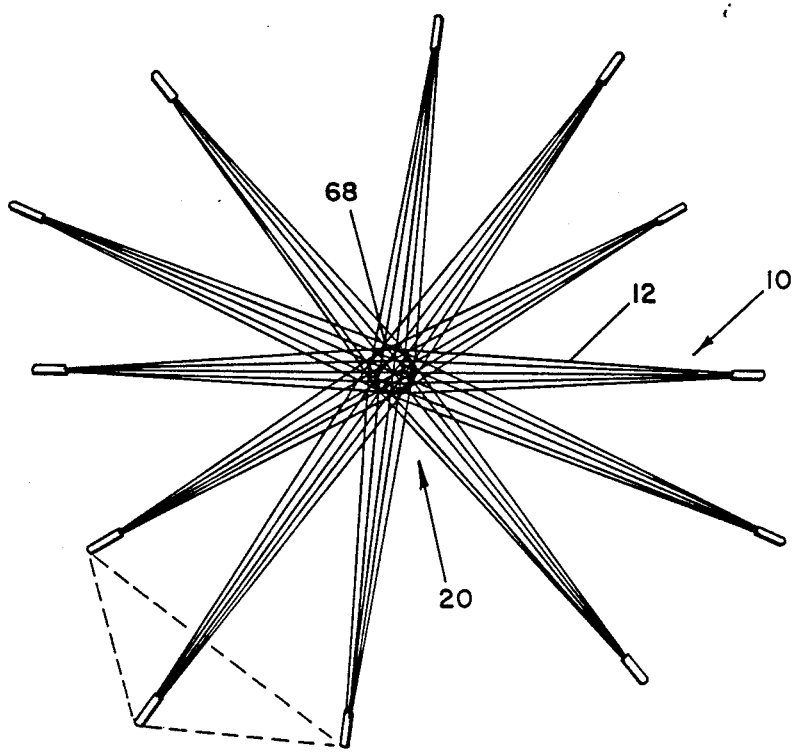
FIG — 24
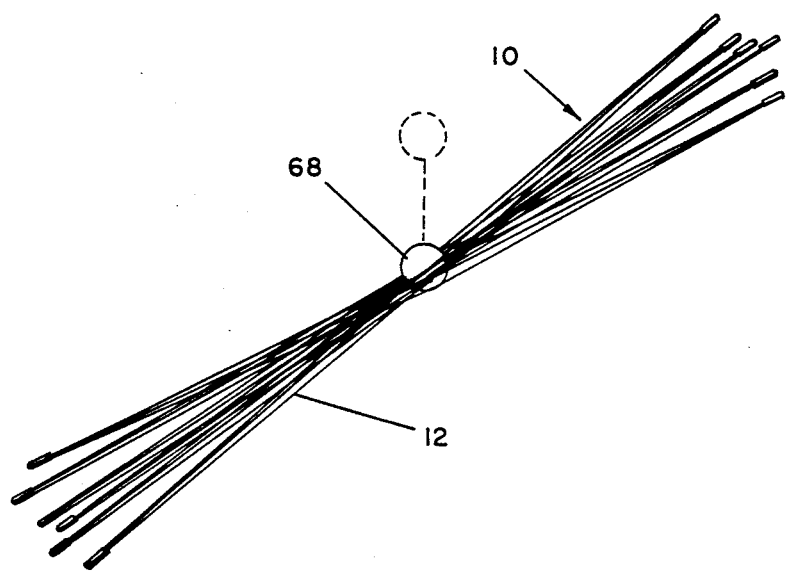
FIG — 25

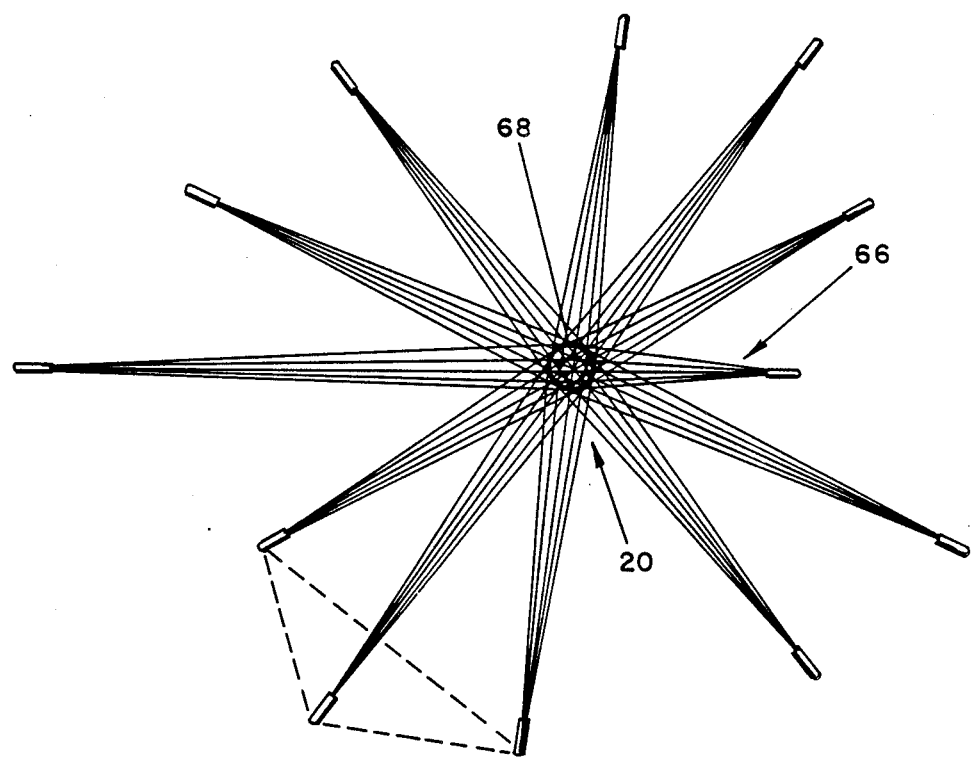
FIG—26

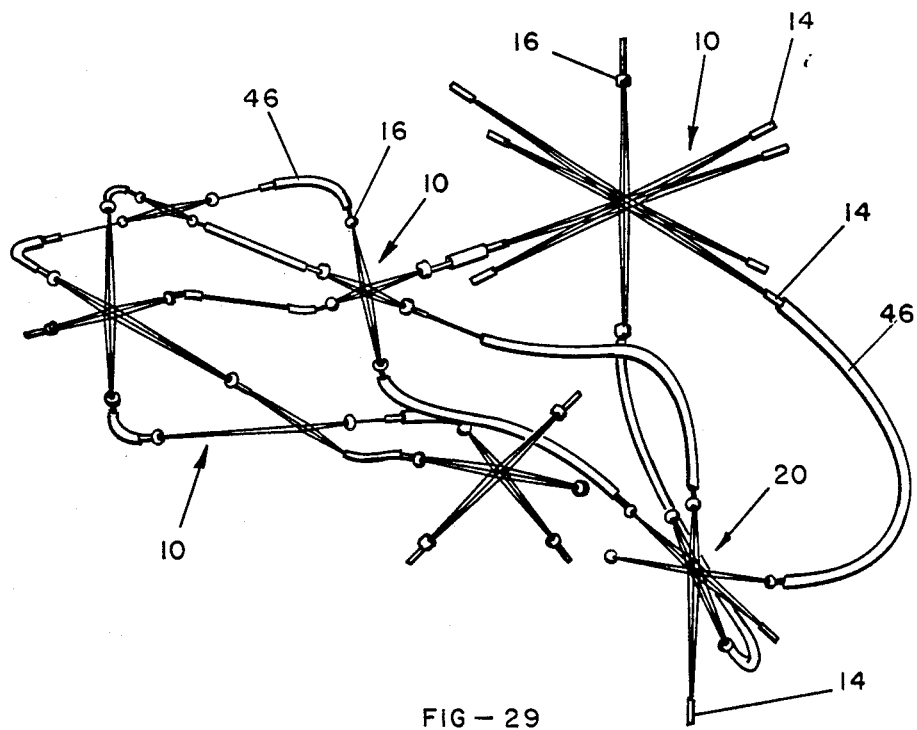
FIG—29
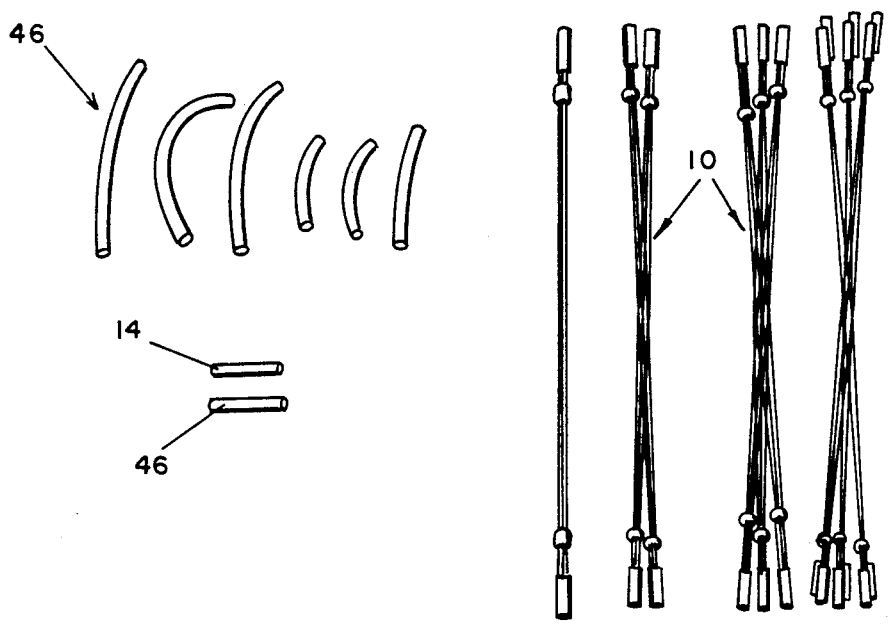
FIG—30

WOVEN WIRE APPARATUS

FIELD OF THE INVENTION

The invention relates to woven wire structures and more particularly to woven wire structures comprising a plurality of intersecting multi-wire elements which are preferably capped and comprise slidably positionable retainers.

BACKGROUND OF THE INVENTION

Bundled wire has been used in toys and various other applications. Cables comprising bundled wire are well known for their strength, flexibility and long life.

Reference is made to FIG. 1 which shows a prior art toy or amusement device 4, having several wires "woven" together at central woven wire joints 5. As seen therein, several pluralities of wire bundles 6 are also joined at their tips 7 using flexible tubing such as neoprene tubing 8. Prior art device 4 may be "accordioned" by a user, either horizontally or vertically, and the bundles 6 are movable in concert about their joints 5. This device 4 is an "executive toy," and is not adapted to other uses. Most notably, since there are no bundle squeezing retainers, the joints 5 of device 4 are not adjustable for movability or fixable, but are quite flexible at all times, making the device unstable. Thus, this device 4 is unsuited to serve as a support structure, shock absorber, or other purpose served in accordance with the invention. The use of intersecting wire bundles to form a structural element with an adjustable joint, movable as well as fixable, is unknown in the prior art.

SUMMARY OF THE INVENTION

In accordance with the present invention there is provided a woven wire apparatus comprising at least one bundle, which bundle comprises a plurality of multi-wire elements. Each multi-wire element has a first end and second end, and each multi-wire element preferably further comprises a plurality of stiff but slightly flexible wires preferably of substantially similar length. These wires may be solid or hollow. Each multi-wire element comprises means for positioning the multi-wire elements in a mutually intersecting relationship to one another, and means for joining the first end and the second end of the multi-wire elements whereby the elements are retained in an intersecting relationship to one another. A wire retainer fixes the elements in position.

In the preferred embodiment, the end joining means are removably positionable on the ends of the multi-wire elements and may comprise, for example, generally tubular caps, flat bases, suction bases, balls, padded bases, or the like. The end joining means of the apparatus preferably may comprise rigid connectors, movable connectors, including a mechanical hinge structure, and may further comprise color coding.

The preferred wire retainers are generally cylindrical and slidably and removably positionable on the multi-wire elements. The wire retaining structure preferably comprises color coding and a ring, tube, cinch, strap, clip, or the like, fixable about the joint.

The preferred embodiment of the invention comprises multi-wire elements with a like plurality of wires. The multi-wire elements may comprise wires of substantially similar length or substantially different length.

The multi-wire bundle of the preferred embodiment is collapsible and comprises an odd number of wires, preferably at least three wires. The preferred embodiment of the invention comprises multi-wire elements of substantially like length to provide a generally symmetric apparatus, although multi-wire elements of substantially different length are included in the invention. One embodiment of the invention is useful for holding an object within the joint.

The apparatus may further comprise two or more bundles positionable in an adjoining relationship, being stackable or positionable side by side or stackable. The bundles preferably comprise stabilizing means or support members. The multi-bundle apparatus of the invention is useful for many applications, including as a support structure, a cover, or fabric. The bundles may be positioned in a substantially concave shape, a spherical shape, or various other shapes. The adjoining bundles may be collapsible.

There is further provided in the present invention a woven wire apparatus further comprising dynamic means for providing motion to the multi-wire elements. The dynamic means may provide alternating motion of the multi-wire elements, such as for a pump. The embodiment may comprise support members. The bundle may be fixed in position after motion is provided, such as for a valve It is therefore one object of the invention to provide a structurally sound joint using intersecting wire bundles.

Another object of the invention is to provide wire bundle joints usable in a wide variety of structures.

Yet another object of the invention is to provide a wire bundle joint capable of holding a object.

Still another object of the invention is to provide a wire bundle joint capable of manual or mechanical adjustment for position.

One advantage of the present invention is that joints can be easily constructed in accordance therewith.

Another advantage of the invention is that movable and fixable wire bundle joints can be provided therewith.

Still another advantage of the invention is that the movability of a joint in accordance therewith can be adjusted using retainers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 9 illustrates a support structure embodiment;

FIG. 10 illustrates the support structure of FIG. 9 in a partially collapsed state;

FIG. 11 illustrates the support structure of FIGS. 9 and 10 in a substantially collapsed state;

FIG. 15 illustrates a tower-type embodiment in a collapsed state for ease of transport, such as by ship;

FIG. 16 illustrates the web-type embodiment of FIG. 15 positioned near a ship;

FIG. 17 shows a support embodiment in use as a table top support;

FIG. 18 shows another support embodiment useful as a table top support;

FIG. 19 illustrates a three bundle embodiment as a support for a portable stool;

FIG. 20 shows a four bundle embodiment useful as a support for a portable chair;

FIG. 21 shows the FIG. 20 embodiment in a collapsed state;

FIG. 22 shows a pair of stacked three bundle embodiments used as a decorative plant stand;

FIG. 23 depicts an embodiment of the invention in use as a tepee style tent frame;

FIG. 24 illustrates a holding embodiment wherein an object is held within a joint;

FIG. 25 illustrates the embodiment of FIG. 24 in a collapsed state for insertion or removal of the object;

FIG. 26 illustrates the embodiment of FIG. 24 under impact;

FIG. 29 illustrates a novelty embodiment;

FIG. 30 illustrates collapsed bundles and flexible or rigid connectors, such as utilized in the FIG. 29 embodiment;

DETAILED DESCRIPTION OF THE INVENTION

A woven wire apparatus in accordance with the invention provides a new tool. This woven wire apparatus comprises essentially rigid elements held together in a unified woven joint by compression. The joint can be used as a moving or movable joint where the elements are allowed to move relative to one another or it can be used as a fixable or fixed joint where the elements are fixed relative to one another through retaining devices or other structures. The woven wire apparatus of the invention is useful as a support or holding structure. A woven wire joint in accordance with the invention requires no pin, weld or other relatively weak link. Most conventional joints are weaker than what they link because of the necessity of such a pin, bolt, hinge, adhesive or other such means.

Figure 1:
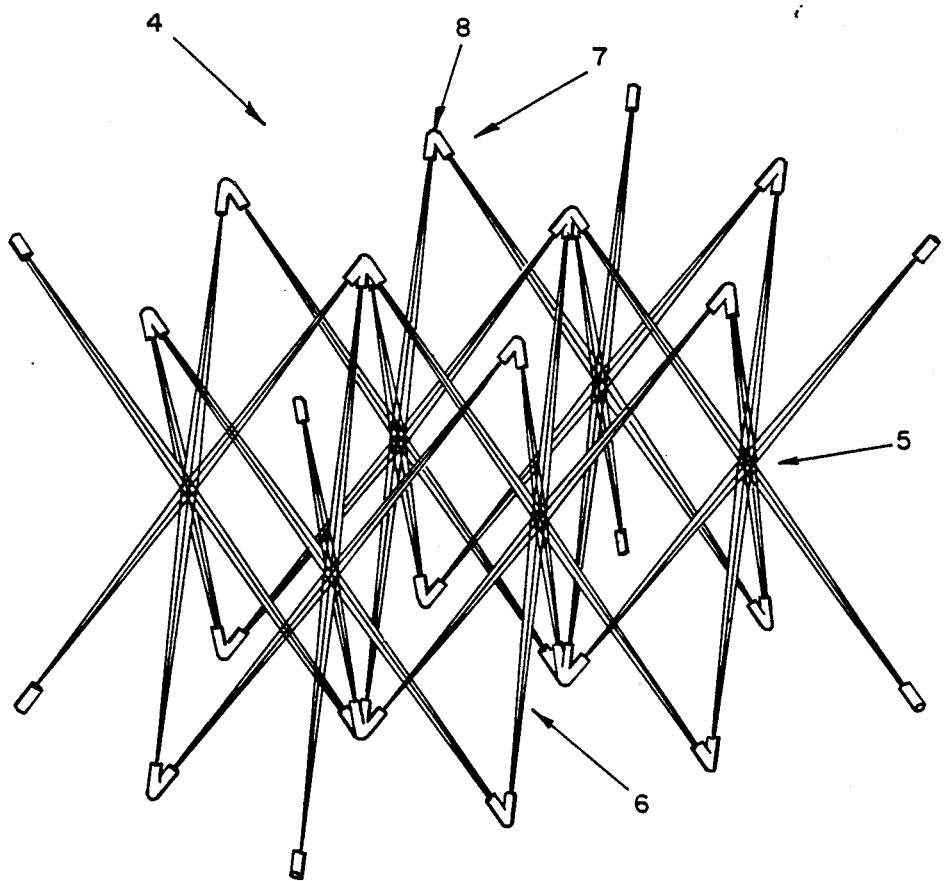
FIG. 1 shows a prior art toy device having unadjustable joint mobility.
Figure 2:
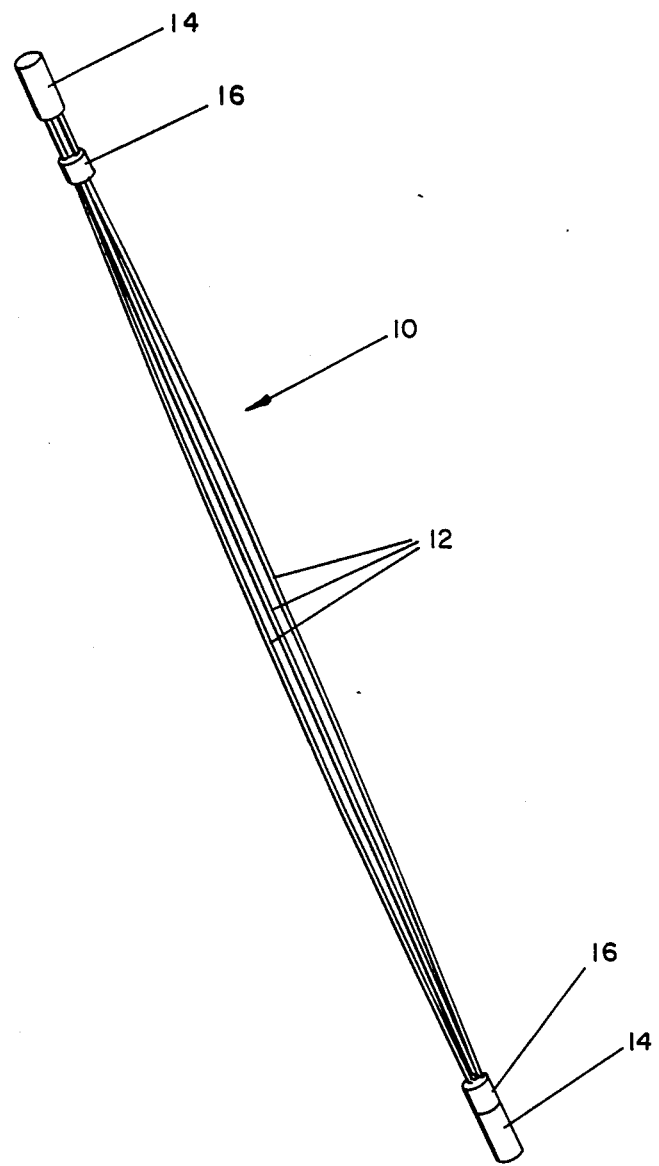
FIG. 2 shows a multi-wire element or wire bundle used in practicing the invention.

Reference is made to FIG. 2 which shows a wire bundle or multi-wire element 10 used in practicing the invention. Element 10 comprises a plurality of wires 12, preferably an odd number of wires. Three wires 12 are shown for clarity of illustration, but five, seven or more wires are also usable in practicing the invention. The wires 12 preferably comprise generally rigid, but somewhat resilient or flexible wire, such as steel piano wire, but can comprise bendable wire such as copper and aluminum. The wires 12 can also be made of plastic, wood and other such materials and of any structurally desirable length and diameter. The element 10 can be a very small size, such as from less than an inch in length, to a very large size, such as many yards, since the principles of the invention apply no matter what the scale. The wires can be solid or tubular, and can be telescoping, lockably or unlockably. Hollow wires can be used to transmit liquids, gas, or solid materials. The wires can be used to transmit electricity, or can be used as conduit to enclose electrical wiring or plumbing. The term "wire," as used throughout the specification and claims, includes all such variations Element or bundle 10 is preferably held together at its ends by covers or caps 14. Although caps 14 are illustrated as actually covering the ends of the wires 12, they need not. Tubular or cylindrical caps could be used with the ends of the wires sticking through. Likewise caps could comprise flat caps, padded caps, ball tips, or suction ends to add stability to the base of a structure or to the object supported by the structure. Caps or covers 14 may provide a neat appearance and seat readily, allowing for easy assembly and disassembly of element 10, as well as for easy joining and unjoining of a plurality of bundles.

One or more retainers 16 are provided on each of the bundles 10 for fixing the bundles 10 Retainers 16 are preferably slidable along the bundles 10 but could be fixable items, such as rings, tubes, clips, straps, cinch straps, and the like. Straps may have fixed tension or may have rings or bars through which a strap may be threaded. Retainers 16 are used to squeeze, compress, or hold the bundles 10 and thereby tighten the joint of intersecting wire bundles, as much as desired or needed. When the joint is tightened, the woven wire structure of the invention becomes fixed or rigid.

Caps 14 and retainers 16 can be color coded in any fashion to provide a user with identification means for an element, such as: defining its function in a particular structure in which it is used, i.e., whether it should be cinched tightly in place with retainers 16 to provide a relatively fixed joint; whether it should be cinched at one end only; or whether it should be loosely cinched or not cinched, to provide good freedom of movement for the joint of which the element is a part. Although the drawings show only one retainer for each end, multiple retainers (not shown) may be utilized in accordance with the invention to provide e.g., variable tension to the joint or color coding.

Figure 3:
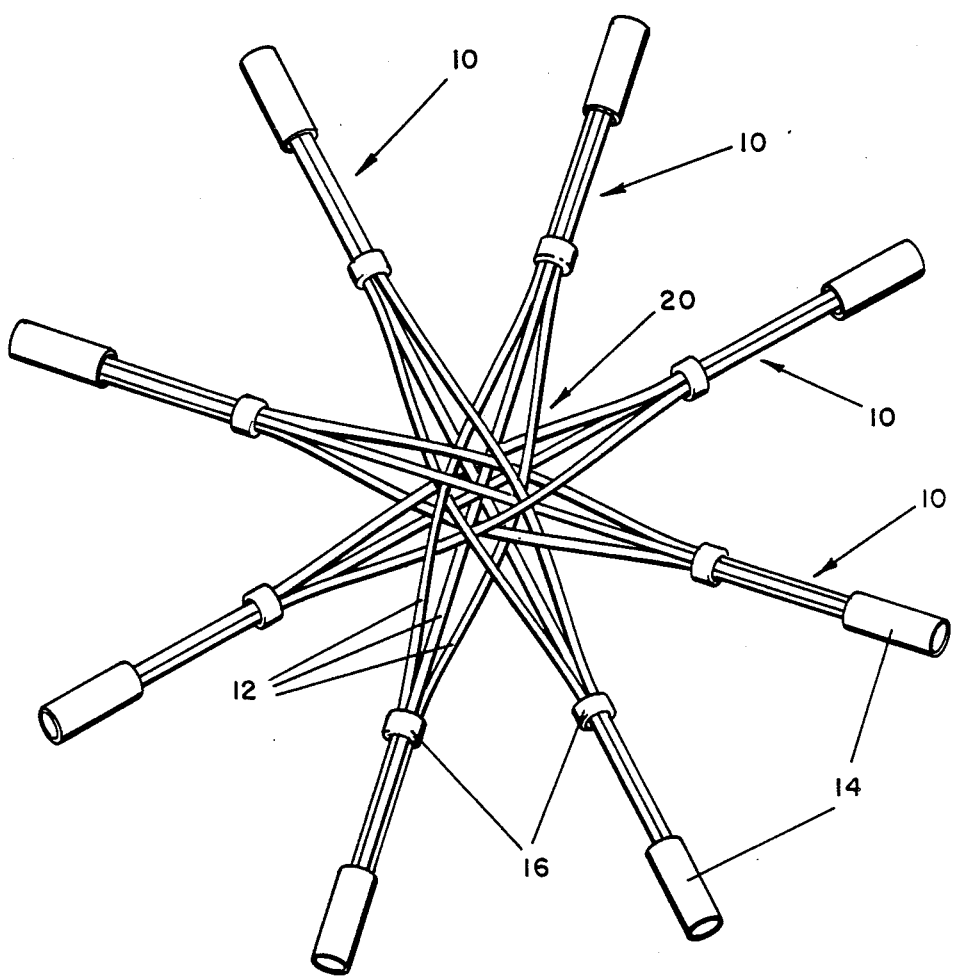
FIG. 3 illustrates a preferred embodiment of the invention assembled from multi-wire elements such as shown in FIG. 2.
Figure 4:
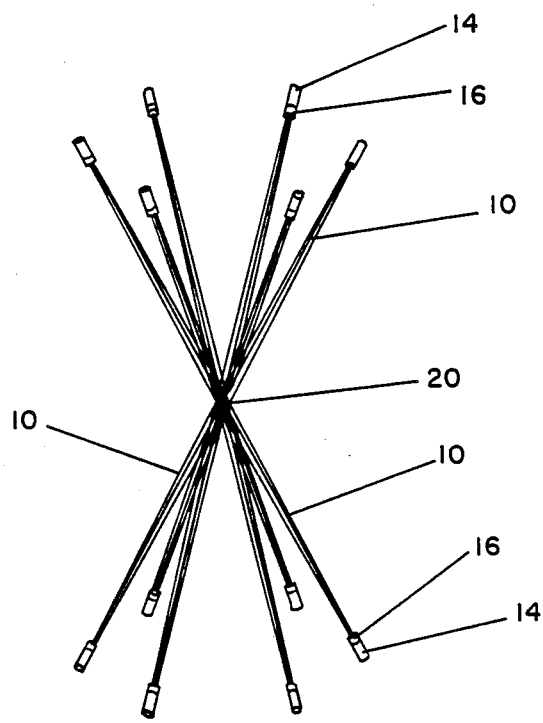
FIG. 4 depicts another embodiment of the invention also assembleable from elements, such as shown in FIG. 2.

A multi-wire element 10 is used in combination with one or more other multi-wire elements in practicing the invention for providing a woven wire structure. FIG. 3 illustrates four multi-wire bundles 10 joined to provide woven wire joint 20. FIG. 4 depicts six elements 10 joined to provide joint 20. FIG. 30 illustrates one-, two-, three-, and six-bundle elements, in a folded or collapsed state. FIG. 3 shows retainers 16 slideably moved towards the joint 20, whereas FIG. 4 shows retainers 16 adjacent the caps 14. To tighten joint 20, all a user need do is move retainers 16 toward the joint to tighten the joint and render it less movable. FIGS. 3 and 4 are for purposes of illustration only, and the invention can comprise any suitable number of multi-wire elements.

Figure 5:
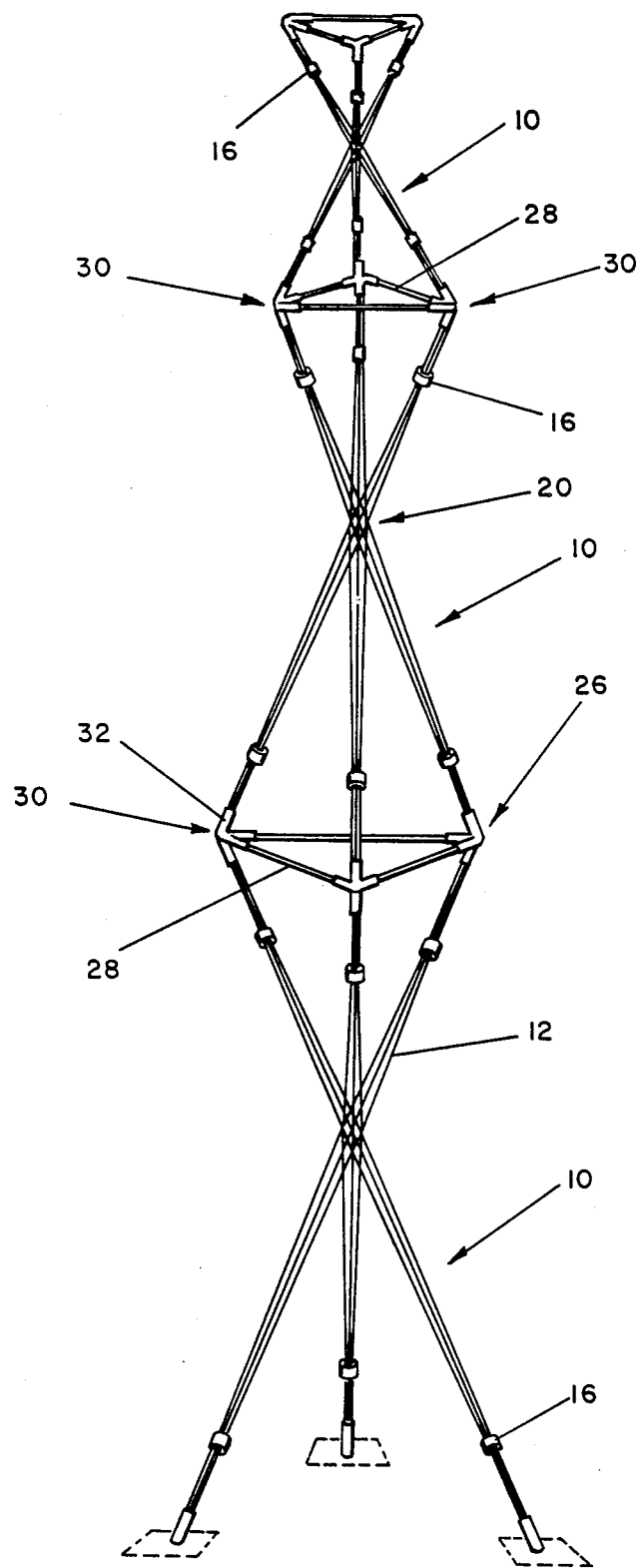
FIG. 5 shows a tower-type structure embodiment.

Assembled elements such as those of FIGS. 3, 4, and 30, can be further joined at the tips, as shown in FIG. 5, which illustrates a tower-type structure embodiment. The tips 26 of each bundle 10 may be joined at junctures 30 by attachment means 32 common to the art, such as neoprene sleeves or mechanical joints such as those shown in FIGS. 31 and 32. The tips 26 of bundle 10 may be joined to the tips 26 of a second bundle 10, which in turn may be joined to a third bundle 10, creating the tower structure of FIG. 5. Such a tower may consist of any number of bundles 10, but preferably at least two, multi-wire bundles. The FIG. 5 embodiment may be stabilized by means of retainers 16 slidably fixed along the length of the multi-wire bundles and spreading each base of each bundle so that the height and weight of the tower structure may be safely maintained. The structure may be further stabilized or balanced by cross members 28 placed at junctures 30 of each bundle 10. As can be seen by one skilled in the art, such an embodiment would be useful in building systems or construction applications. Still another application could be found in, for example, hat or helmet construction offering a cushioning effect. The tower structure of the FIG. 5 embodiment may be used to support a wide variety of technological hardware, including, but not limited to, communications disks, as shown in FIGS. 7 and 8, multi-function electromagnetic arrays, solar collectors, or may be utilized as radio towers, television towers, oil rigs, and the like.

Figure 6:
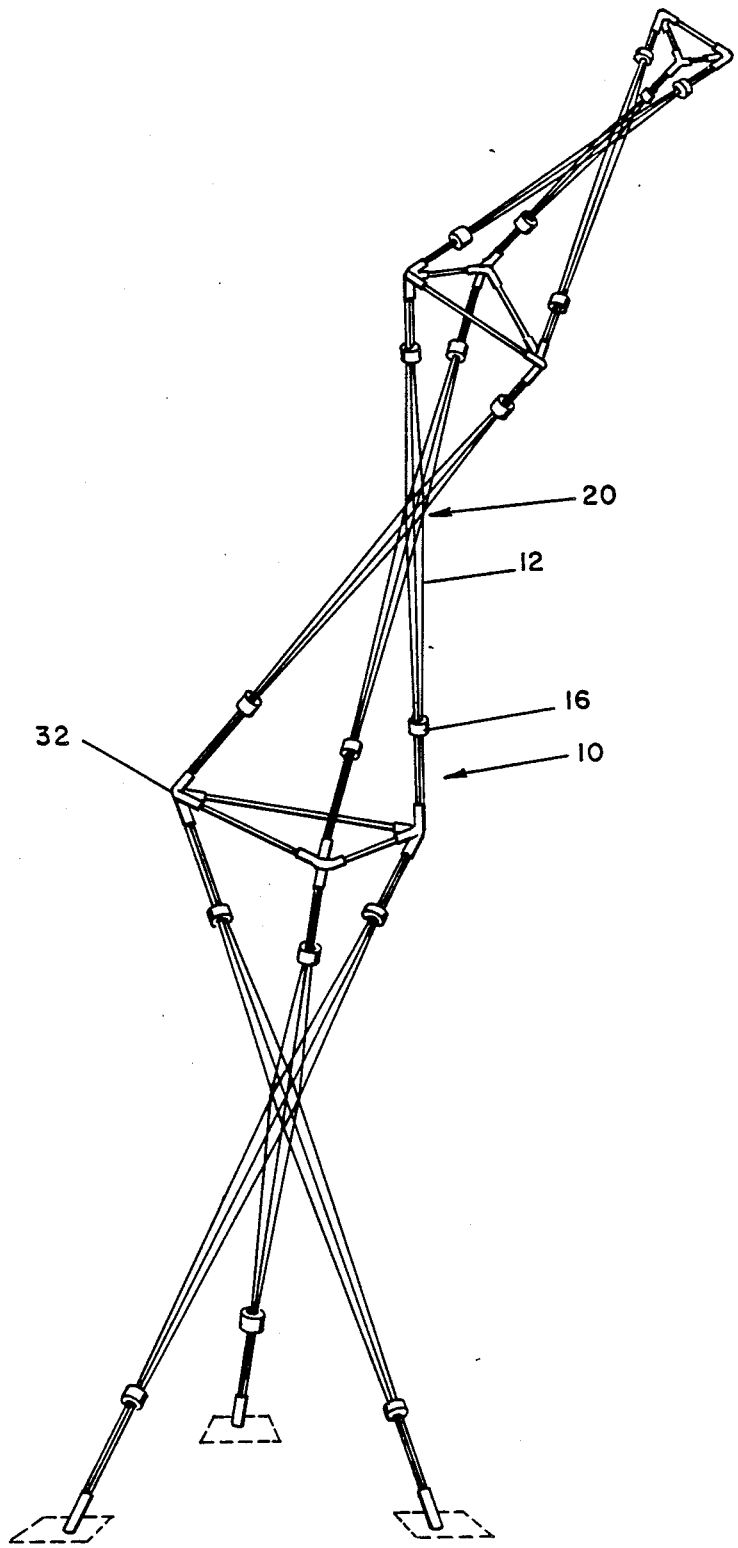
FIG. 6 shows the tower-type structure of FIG. 5 in a bent position.

FIG. 6 illustrates the FIG. 5 tower structure in a bent position to accommodate a desired disposition of a supported object. The manner of adjustment to this position comprises slidably moving the retainers 16 away from the joints 20 along the length of the wires 12 of selected bundles 10 to permit lateral movement of the joint 20. The attachment means 32 by their preferably inherent flexibility or mechanical mobility permit the radial movement of one bundle 10 atop or below another bundle 10. PreferablY the tower structure is anchored to the ground or other surface to prevent the tower from tipping over.

Figure 7:
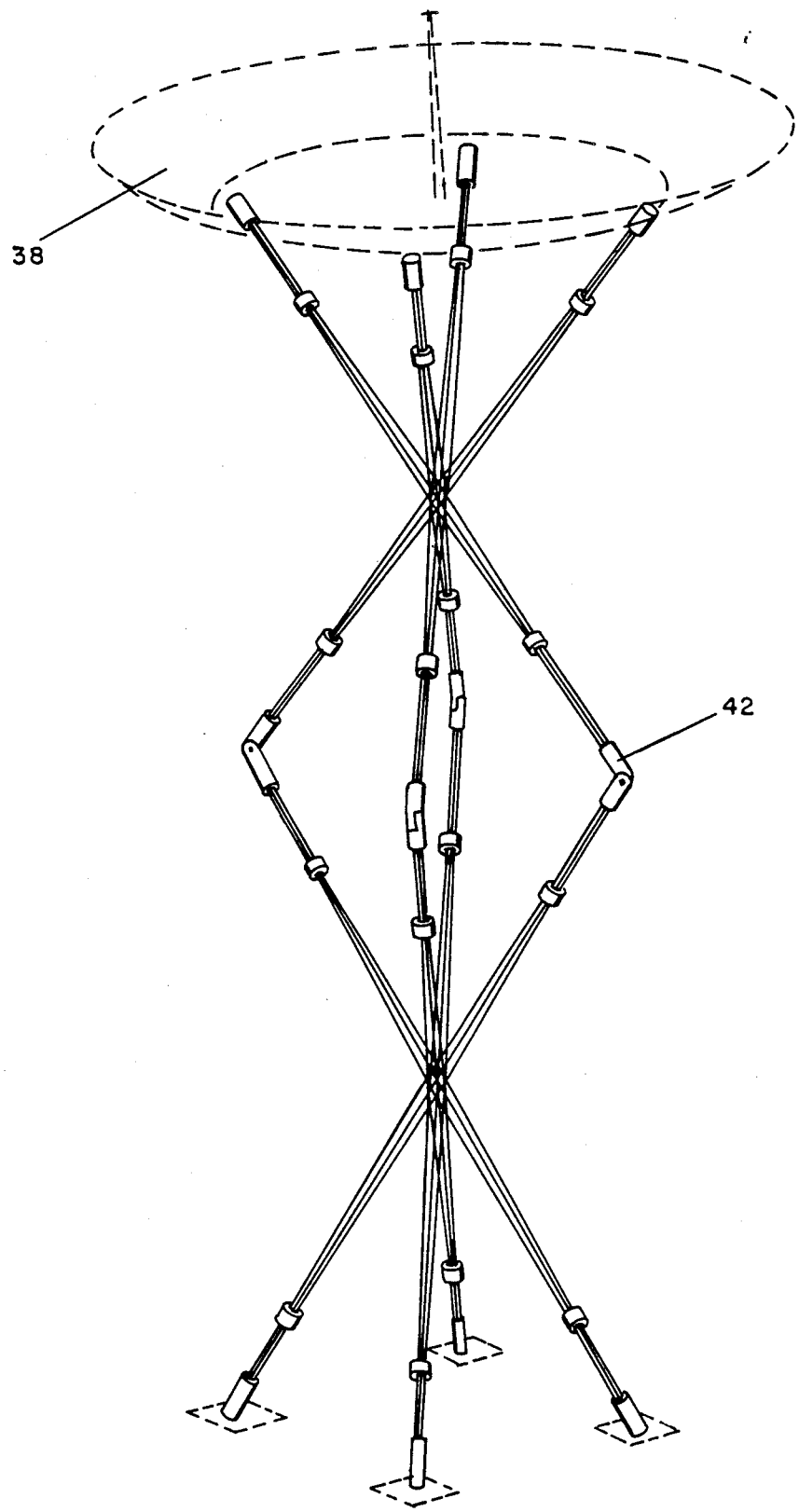
FIG. 7 shows a tower-type structure embodiment useful for supporting a receiving or transmitting dish.
Figure 8:
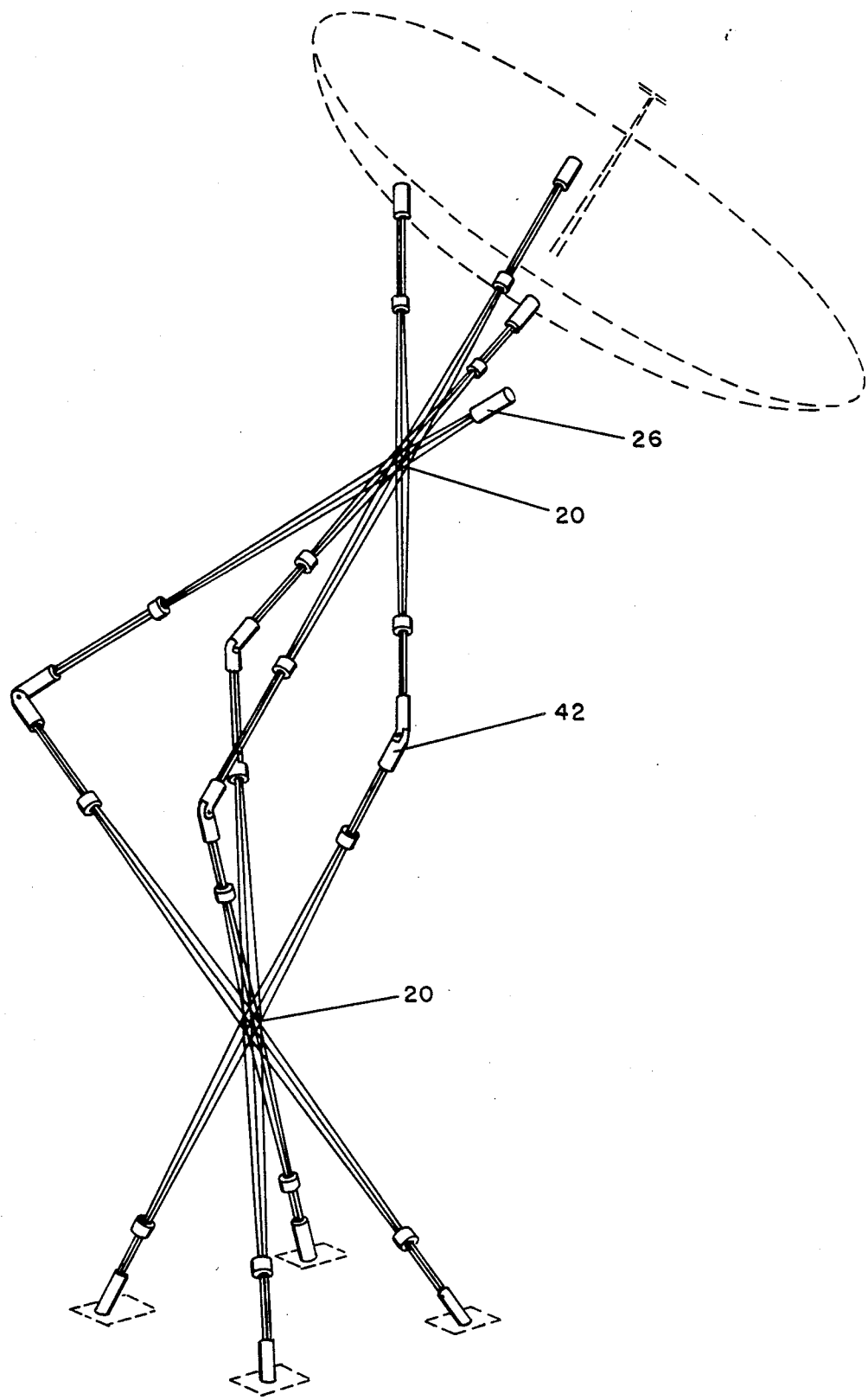
FIG. 8 shows the tower-type structure of FIG. 7 in a bent position.

Another tower-type structure embodiment of the invention is illustrated in FIG. 7 supporting a receiving or transmitting dish 38 (dashed lines) in a substantially vertical position. FIG. 8 illustrates the FIG. 7 embodiment in a bent position. As can be seen in FIGS. 7 and 8, the cross members 28 of FIGS. 5 and 6 may or may not be employed in the practice of the invention, but mechanical joints 42 may be used in place thereof to achieve the same result. Further illustrated in FIG. 8 is the manner by which an object may be supported by the tower. The tip 26 of a bundle need not extend to the supported object, but may be capped off or shorter than the other elements, thus illustrating the combined use of varying lengths of bundles. Likewise, the length of wires in each element need not be similar. As can be appreciated by those skilled in the art, the invention is useful in robotics applications, for example manipulative arms, walkers and the like.

Figure 12:
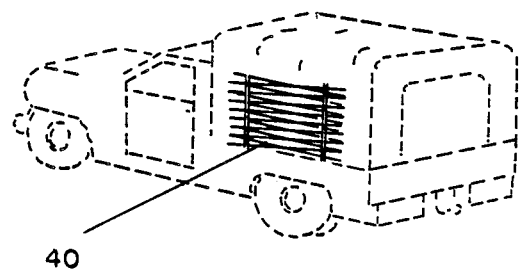
FIG. 12 shows a building web structure embodiment in a collapsed state for ease of transport, such as by truck.
Figure 13:
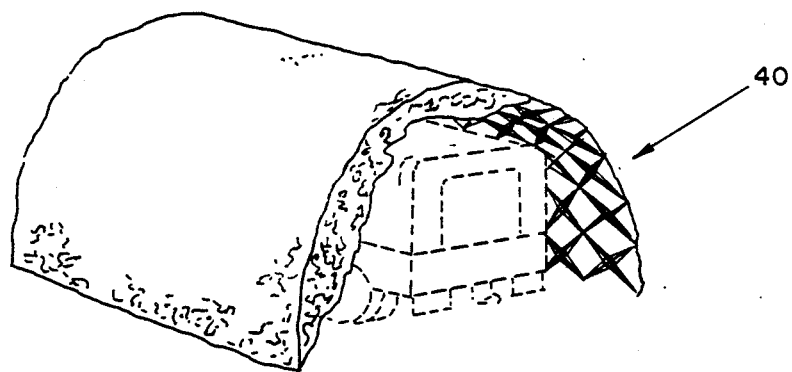
FIG. 13 shows the building web structure of FIG. 12 in use to cover and camouflage the truck.

FIG. 9 illustrates an additional tower structure embodiment which can be easily collapsed. To fix the position of the tower, the retainers 16 are slidably moved toward the tips 26. Flexible or mechanical attachment means 32 allow the tower structure to be partially collapsed. FIGS. 10 and 11 illustrate the collapsible feature of the invention in progressive stages, and further illustrate the disconnecting of all but the largest cross members 28 which connect the bundles 10. The cross members 28 of FIGS. 10 and 11 could be of two-piece construction, but may comprise a single member which could be dislodged from the attachment means 32 at one end and left connected at the opposite end or taken out completely. As can be seen, if the tower structure were to comprise mechanical joints, a supported object or surface such as a platform could be leaned, bent, raised or lowered. This embodiment is also useful in, for example, lifting platforms, collapsing antenna, collapsible dome support, and the like The bundles may be assembled in such a manner, side by side and end to end to weave a single layer web structure that is capable of being used flat, such as in shock absorbing applications or configured into a substantially concave, hemispherical, or even spherical shape to act as a support structure. FIG. 12 shows the collapsed state of such a building web structure 40 of the invention in transport, thereby illustrating the portability of the structure. FIG. 13 illustrates the building web structure 40 positioned in an arc to provide a cover or shelter. As seen in the FIG. 13 embodiment, the building structure may be covered, such as camouflaged for military purposes, thereby allowing a transport vehicle, personnel or objects to be placed in storage within. The invention is also useful in building or shelter systems, including, but not limited to, a collapsible dome structure. The apparatus of the invention would also be useful in building a receptacle. As used herein, the term "dome structure" is defined as including a cover, shelter, support, or receptacle.

Figure 14:
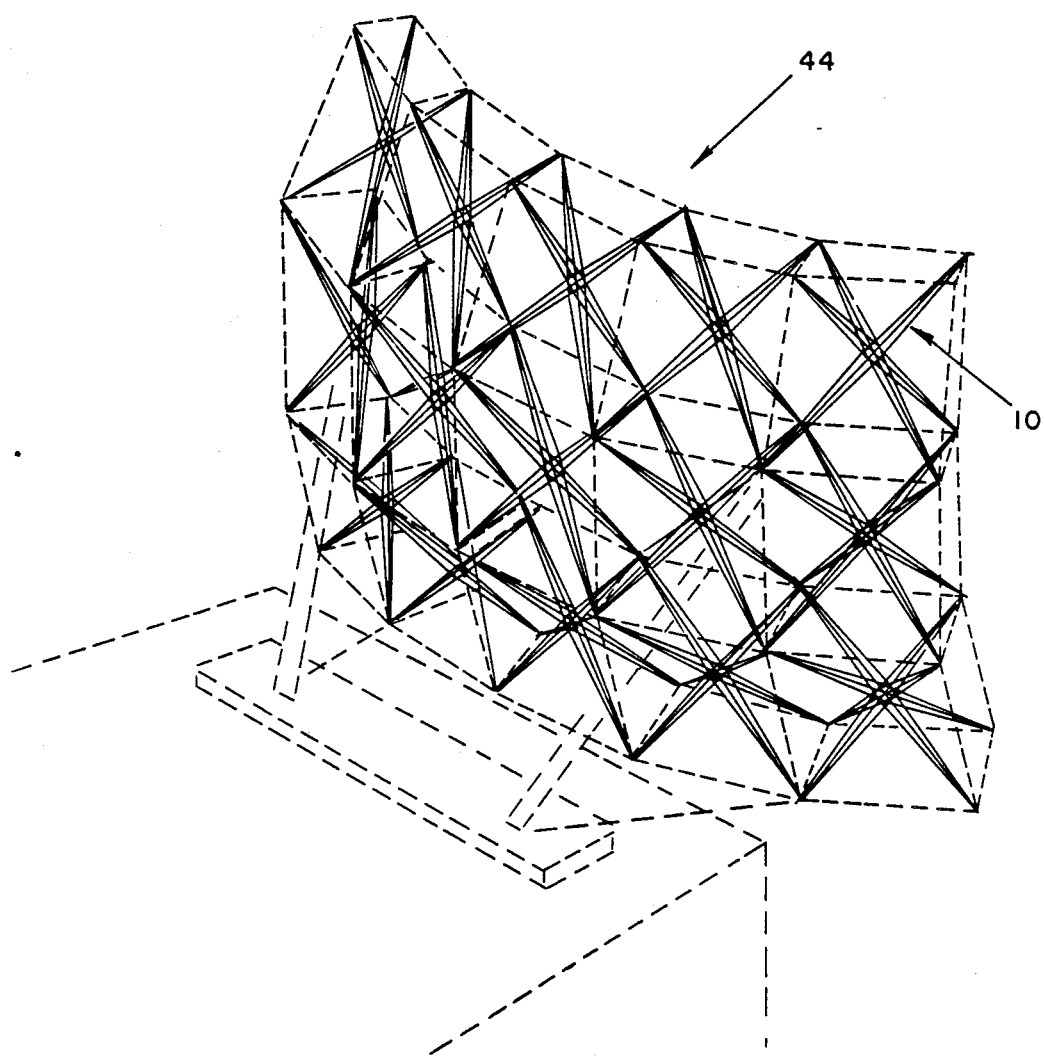
FIG. 14 shows a web structure embodiment useful as a receiving or transmitting dish.

A further illustration of the manner in which bundles 10 of the invention may be woven into a concave shape is shown in FIG. 14. Bundles are joined side by side and end to end to create the web structure embodiment 44 useful as a receiving or transmitting dish. The web structure 44 ma further be covered with a surface material (dashed lines) to enable the structure to support the communications functions.

As is evident to one skilled in the art, the bundles can be assembled to form any number of shapes for any number of functions. For example, the web structure may be used as a collapsible bird cage or animal confinement, playpens, shelters, trellises, plant covers, greenhouses, and jungle gyms, as well as other moveable, portable yard toy structures. The web structure may further be laid flat on an even surface, molded to an uneven surface, formed into an arc or dome-like configuration or joined end-to-end to create a spherical shape.

FIG. 15 shows a large web-type embodiment 43 in a collapsed state for ease of transport, such as on an ocean transport. FIG. 16 illustrates the web structure 43 in an assembled state and positioned in relation to the ocean transport. Such a structure could be used, for example, to support a drilling platform onto which an oil derrick may be installed.

As can be appreciated by one skilled in the art, the multi-web structure embodiment of the invention can be used for a wide variety of applications; for example, a portable bridge in military or civilian applications for crossing wide bodies of water or traveling over uneven terrain, a table support, a wine bottle rack, space station or space satellite applications and the like.

As stated earlier, the wires and bundles may be of any size. This size could be very small, so that even a fabric (not shown) could be constructed out of a multi-web embodiment. For instance, a space suit could be made of such a fabric. This suit would be strong, yet collapsible into a very small space.

FIGS. 17-21 show application of the multi-wire bundles 10 of the invention as a furniture support. FIG. 17 illustrates the use of bundles 10 to support a table top 24. Retainers 16, when moved close to joint 20, fix and stabilize the bundle 10 Another table surface 25 may be supported, as shown in FIG. 18, by providing ring retaining means 27, rather than individual retainers disposed along the length of the wires, to maintain a fixed positioning of bundle 10. The positioning is determined by the size of ring provided. A larger ring will permit the joint to open further and support a larger object. Further illustrated in the FIG. 18 embodiment are end covers 15 which may comprise hinged or fixed extremities capable of supporting an object. The end covers 15 may further comprise suction means to secure the object or padded means to cushion an object or the base upon which the structure is placed. FIG. 19 illustrates a chair seat 45 supported by bundle 10, the wires of which are secured in relation to each other by retainers 16. Still another chair embodiment is shown in FIG. 20 which illustrates four bundles 10 joined in pairs by attachment tubes 46 to provide a support for a barrel type chair surface 47, which structure is collapsible as shown in FIG. 21. Such an embodiment may or may not employ varying sizes of bundles.

The FIGS. 20 and 21 embodiments further illustrate the use of alternative caps or end pieces, such as balls 48 and feet 50. The attachment tube connectors may be flexible or rigid and may be moveable or fixed. Such tube connectors are also useful for robotics applications and other applications requiring movement.

Other examples of household-type items are illustrated in FIGS. 22 and 23. Two or more structures 10 of the invention could be used in combination as stacked in the FIG. 22 embodiment to create a plant holder. FIG. 23 depicts a tepee style tent 70.

A novel application for the bundles of the invention may be as a shock absorber (not shown) because of the inherent movement of the bundles when they are not fixed in position. Such embodiments would be useful as a shock absorbing pad for transporting fragile cargo, bed springs, or a damping device.

Figure 27:
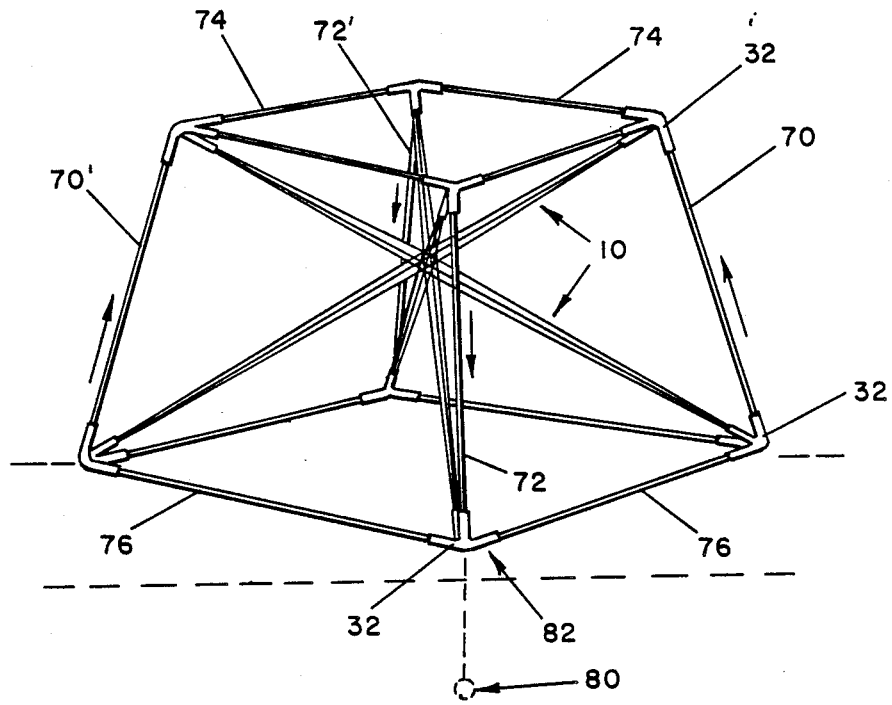
FIG. 27 illustrates a moveable embodiment, useful as for example a pump.
Figure 28:
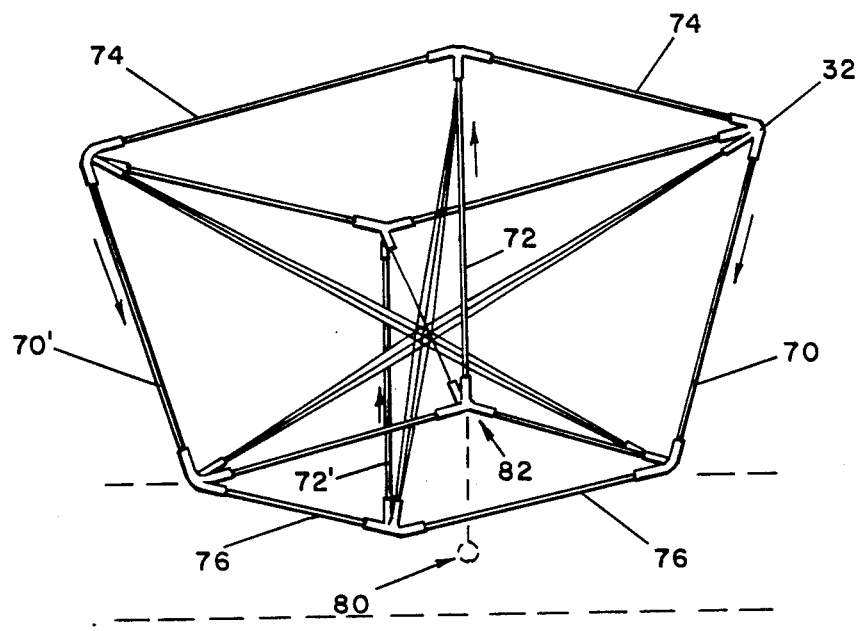
FIG. 28 illustrates the FIG. 27 embodiment moved relative to FIG. 27.

An example of a holding embodiment, useful as a shock absorber, is shown in FIGS. 24-26. The flexible wires 12 of the apparatus of the invention permit manual or mechanical extension at the joint 20 to allow insertion of an object 68 into the joint 20 when the structure is in a folded or collapsed state (see FIG. 25). This application may be useful in transporting fragile or potentially toxic substances or explosive substances thereby preventing damage to the object 68 or its contents. In a preferred embodiment, a five-wire, six-bundle woven structure is utilized, creating an icosahedron which is particularly useful when combined with other similar structures, in forming an overall cubic or rectangular shape which could fit within conventional shaped containers. FIG. 26 illustrates the five-wire, six-bundle woven structure of the FIGS. 24 and 25 embodiments under impact. As can be seen, an impact on the end of one bundle 66 which pushes this bundle 66 out of symmetric relation to the other bundles, does not disturb the object 68 being held within the joint 20. The dashed lines in FIGS. 24 and 26 illustrate that a covering might be placed around a part or all of the structure FIGS. 27 and 28 illustrate another novel application of the invention. A dynamic structure, such as a pump, may be created by utilizing bundles 10, joined at attachment means 32 by vertical cross members 70, 70', 72, and 72', and horizontal cross members 74 and 76. The "pump" motion is achieved by alternating the movement of the vertical cross members 70, 70', 72, and 72', relative to a fixed reference line (dashed lines). For instance, FIG. 27 shows cross members 70 and 70' moving upward (see arrows) with cross members 72 and 72' moving downwards (see arrows). FIG. 28 illustrates the opposite movement of the FIG. 27 embodiment: cross members 70 and 70' move in a downward direction (see arrows) as cross members 72 and 72' move upward. Note that if an object 80 is attached to the end 82 of one of the bundles, it will move upwards or downwards, depending on the movement of the cross members. One or more vertical cross members may comprise hydraulic means to perform an actuating motion, resulting in a pumping motion. If the structure is fixed in an open or closed position, a valve embodiment may result. The manner of fixing may be manual or mechanical. The structure may comprise retainers (not shown) for fixing the position of the structure. The attachment means 32 may comprise a flexible member or a jointed or hinged member.

FIG. 29 illustrates the use of multiple bundles woven in various combinations, the combinations being linked by the flexible tubing illustrated in the FIGS. 20 and 21 embodiments. As can be seen, the flexible tubing may comprise any length useful for many purposes. An assortment of pieces useful in assembly of the structure of the FIG. 29 embodiment are further shown in FIG. 30, including flexible tubing, multi-wire bundles and rigid tubing.

Figure 31:
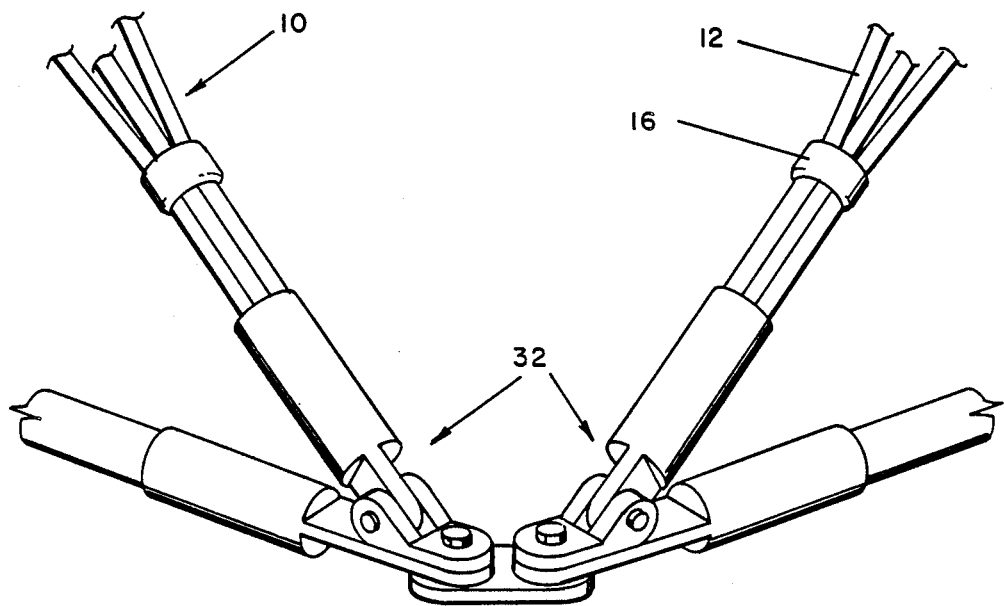
FIG. 31 illustrates a mechanical joint useful in accordance with the invention.
Figure 32:
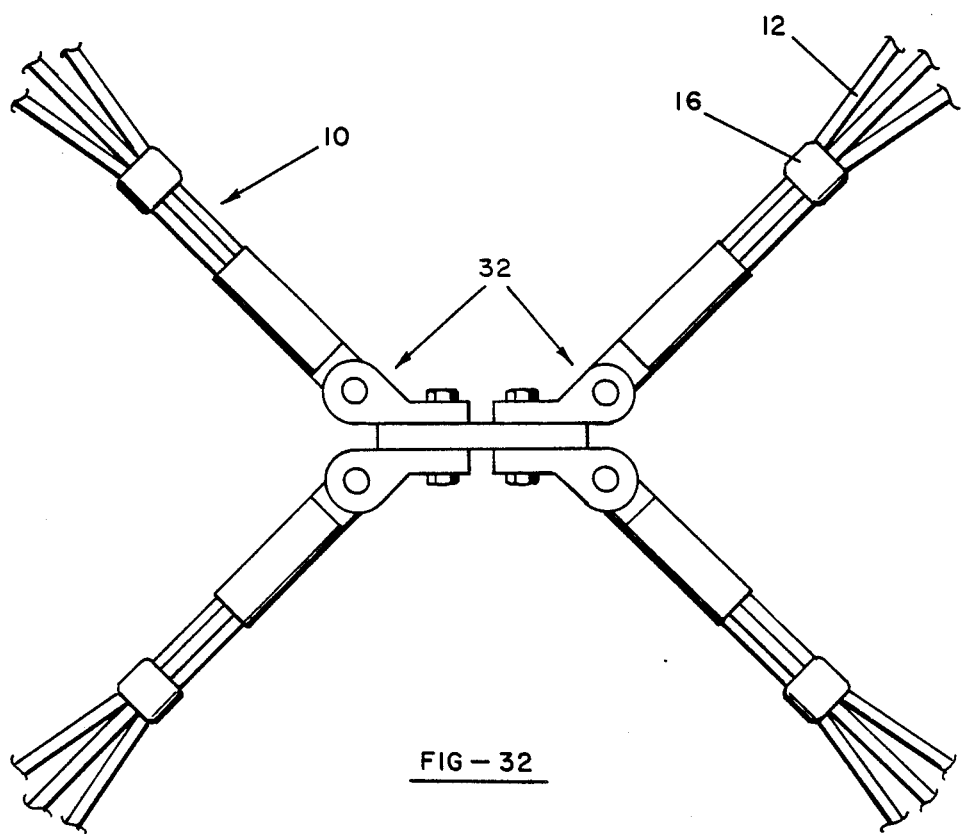
FIG. 32 illustrates another mechanical joint useful in accordance with the invention.

FIGS. 31 and 32 illustrate examples of mechanical joints which may be utilized in the practice of the invention, for permitting independent movement of each element, such as might be utilized in robotics applications, lifting or collapsing.

The multi-wire bundle of the invention may consist of any number of wires, but preferably consists of at least three wires. Any number of bundles can be combined in series, parallel, on top of one another, beside one another, or in any size combination to form a structure. Bundles may further be of varying lengths.

As can be appreciated to those skilled in the art, embodiments of the invention could be used as bed springs, bird cages, wine racks, novelties, collapsible towers, damping devices, shock absorbers, plant trellises, and in fields such as robotics, electrical and electronic equipment, mechanical equipment, bridges and other structures, space and communications devices, as well as many other structures and applications. Structures in accordance with the invention are inherently stable and can support quite heavy loads.

The invention has been described in detail with particular reference to a preferred embodiment thereof, but it will be understood that variations and modifications can be effected within the scope of the invention.

What is claimed is:

1. A woven wire apparatus comprising at least one bundle, said bundle comprising:
    a plurality of multi-wire elements, each said multi-wire element having first and second ends, and each said multi-wire element comprising a plurality of stiff but slightly flexible wires;
    means for positioning said multi-wire elements in a mutually intersecting relationship to one another;
    means for joining said first end and means for joining said second end of said multi-wire elements whereby said elements are thereby retained in said intersecting relationship to one another; and
    movably engageable wire retaining means additional to said positioning means and said joining means for fixing said elements in position and allowing movement of said elements.

2. The invention of claim 1 wherein said end joining means are removably positionable on said ends of said multi-wire elements.

3. The invention of claim 1 wherein said end joining means comprises at least one member selected from the group consisting of generally tubular capping means, flat bases, balls, suction bases, and padded bases.

4. The invention of claim 1 wherein said end joining means comprises rigid connectors.

5. The invention of claim 1 wherein said end joining means comprises movable connectors.

6. The invention of claim 5 wherein said end joining means comprises mechanical hinge means.

7. The invention of claim 1 wherein said end joining means comprise color coding.

8. The invention of claim 1 wherein said wire retaining means are generally cylindrical and are slidably positionable on said multi-wire elements between said joint and said ends.

9. The invention of claim 1 wherein said wire retaining means are removably positionable on said multi-wire elements.

10. The invention of claim 1 wherein said wire retaining means comprise color coding.

11. The invention of claim 1 wherein said wire retaining means comprises a ring, fixable about said joint.

12. The invention of claim 1 wherein said wire retaining means comprises at least one member selected from the group consisting of cinches, straps, and clips.

13. The invention of claim 1 wherein each of said mutually intersecting multi-wire elements comprises a like plurality of wires.

14. The invention of claim 1 wherein said multi-wire elements comprise wires of substantially similar length.

15. The invention of claim 1 wherein said multi-wire elements comprise wires of substantially different length.

16. The invention of claim 1 wherein said multi-wire elements comprise hollow wires for transmitting at least one member selected from the group consisting of solids, liquids, and electricity 17. The invention of claim 1 wherein said bundle is collapsible 18. The invention of claim 1 wherein said multi-wire element comprises at least three wires.

19. The invention of claim 18 wherein each of said multi-wire elements comprises an odd number of wires.

20. The invention of claim 1 wherein each said multi-wire element is of substantially like length to provide a generally symmetric apparatus.

21. The invention of claim 1 wherein at least one said multi-wire element is of substantially different length from said other multi-wire elements.

22. The invention of claim 1 useful for holding an object within said joint.

23. The invention of claim 1 wherein said apparatus comprises two or more bundles positionable in an adjoining relationship.

24. The invention of claim 23 wherein said bundles are stackable.

25. The invention of claim 23 wherein said bundles are positionable side by side.

26. The invention of claim 23 wherein said bundles comprises stabilizing means.

27. The invention of claim 23 wherein said apparatus further comprises support members 28. The invention of claim 23 wherein said adjoining bundles are collapsible.

29. The invention of claim 23 wherein said bundles are positionable in a substantially concave shape.

30. The invention of claim 23 wherein said bundles are positionable in a spherical shape.

31. The invention of claim 23 useful as a support structure.

32. The invention of claim 23 useful as a cover.

33. The invention of claim 23 useful as a woven fabric.

34. A woven wire apparatus comprising at least one bundle, said bundle comprising:
    a plurality of multi-wire elements, each said multi-wire element having first and second ends, and each said multi-wire element comprising a plurality of stiff but slightly flexible wires;
    means for positioning said multi-wire elements in a mutually intersecting relationship to one another;
    means for joining said first end and means for joining said second end of said multi-wire elements whereby said elements are thereby retained in said intersecting relationship to one another; and
    dynamic means for providing motion to said multi-wire elements.

35. The invention of claim 34 wherein said dynamic means provides alternating motion of said multi-wire elements.

36. The invention of claim 35 useful as a pump.

37. The invention of claim 34 further comprising support members.

38. The invention of claim 34 wherein said bundle is fixable in position after motion is provided.

39. The invention of claim 38 useful as a valve.

* * * * *